United States Patent
Aoyama (10) Patent No.: US 8,953,211 B2
(45) Date of Patent: Feb. 10, 2015

(54) COMMUNICATION DEVICE AND NON-TRANSITORY COMPUTER-READABLE STORAGE MEDIUM STORING PROGRAM FOR CONTROLLING THE COMMUNICATION DEVICE

(71) Applicant: Kentaro Aoyama, Nagoya (JP)

(72) Inventor: Kentaro Aoyama, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/178,666

(22) Filed: Feb. 12, 2014

(65) Prior Publication Data

US 2014/0253963 A1    Sep. 11, 2014

(51) Int. Cl.
*G06F 15/00* (2006.01)
*G06F 3/12* (2006.01)
*G06K 1/00* (2006.01)
*H04N 1/00* (2006.01)

(52) U.S. Cl.
CPC ....... *H04N 1/00381* (2013.01); *H04N 1/00106* (2013.01)
USPC .......................................... 358/1.15; 358/1.13

(58) Field of Classification Search
CPC ..................... H04N 1/00381; H04N 1/00106
USPC ................... 358/1.1, 1.15, 1.13, 1.14
See application file for complete search history.

(56) References Cited

U.S. PATENT DOCUMENTS

| 2005/0130706 | A1 | 6/2005 | Yamamoto |
| 2011/0286028 | A1* | 11/2011 | Kinouchi et al. ............ 358/1.14 |
| 2011/0292445 | A1 | 12/2011 | Kato |
| 2012/0105369 | A1 | 5/2012 | Nakamura |
| 2013/0155450 | A1* | 6/2013 | Higashikawa ............... 358/1.15 |
| 2014/0135036 | A1* | 5/2014 | Bonanni et al. ............ 455/456.3 |

FOREIGN PATENT DOCUMENTS

| JP | 2004-222198 A | 8/2004 |
| JP | 2005-020158 A | 1/2005 |
| JP | 2007-067818 A | 3/2007 |
| JP | 2011-103572 A | 5/2011 |
| JP | 2011-182080 A | 9/2011 |
| JP | 2011-223511 A | 11/2011 |
| JP | 2012-095180 A | 5/2012 |
| JP | 2012-160207 A | 8/2012 |
| JP | 2013-147015 A | 8/2013 |

OTHER PUBLICATIONS

U.S. Office Action dated Oct. 23, 2014 from related U.S. Appl. No. 14/195,090.

* cited by examiner

*Primary Examiner* — Douglas Tran
(74) *Attorney, Agent, or Firm* — Scully, Scott, Murphy & Presser, P.C.

(57) ABSTRACT

A communication device, including: a touch sensor configured to detect a touch or an approach of an input object by detecting a change in capacitance; a near field communicator configured to perform near field communication with an information processing terminal present in a communication area in which near field communication is possible, the information processing terminal being capable of performing the near field communication; and a controller configured to control the communication device in accordance with detection of the touch or the approach of the input object by the touch sensor, wherein the controller is configured to reduce detection sensitivity of the touch sensor for detecting the input object when the information processing terminal is in the communication area.

15 Claims, 7 Drawing Sheets

COMMUNICATION DEVICE AND NON-TRANSITORY COMPUTER-READABLE STORAGE MEDIUM STORING PROGRAM FOR CONTROLLING THE COMMUNICATION DEVICE

CROSS REFERENCE TO RELATED APPLICATION

The present application claims priority from Japanese Patent Application No. 2013-042614, which was filed on Mar. 5, 2013, the disclosure of which is herein incorporated by reference in its entirety.

BACKGROUND OF THE INVENTION

1. Field of the Invention

The present invention relates to a communication device configured to perform near field communication with an information processing terminal and a non-transitory computer-readable storage medium storing a program for controlling an operation of the communication device.

2. Description of Related Art

There have been conventionally developed communication devices capable of performing near field communication with information processing terminals such as smartphones and tablet personal computers. In the near field communication, transmission and reception of data can be performed by merely bringing the information processing terminal near to the communication device. Some of the communication devices are provided with operation buttons of touch sensor type for detecting a touch or an approach of an input tool such as a finger of a user. (The input tool may be referred to as an input object.) As the operation buttons of touch sensor type, there are known ones for detecting the touch or the approach of the input tool utilizing a change in capacitance, in other words, by detecting a change in capacitance.

SUMMARY OF THE INVENTION

As described above, the near field communication and the operation buttons of touch sensor type utilizing a change in capacitance (hereinafter referred to as "touch sensor of capacitance type" where appropriate) are very useful technical means. Where the technical means are used in communication devices, the utility of the communication devices is enhanced. However, there may be a risk that a radio wave used in the near field communication and an electric field used in the touch sensor of capacitance type mutually interfere. In particular where an antenna portion for the near field communication and the touch sensor of capacitance type are disposed adjacent to each other in view of operability for the user, the possibility of occurrence of the mutual interference of the radio wave and the electric field becomes considerably high. In a case where the mutual interference between the radio wave and the electric field occurs, the near field communication is unlikely to be established or misactivation of the touch sensor of capacitance type may be caused, in other words, the touch sensor of capacitance type may be erroneously activated. Accordingly, the mutual interference between the radio wave and the electric field is not desirable.

The present invention has been developed in view of such situations. It is therefore an object of the invention to provide, in a communication device having touch sensors of capacitance type and capable of performing near field communication with an information processing terminal, a technique of suppressing mutual interference between a radio wave used in the near field communication and an electric field used in the touch sensor of capacitance type.

The object indicated above may be attained according to one aspect of the invention, which provides a communication device, comprising: a touch sensor configured to detect a touch or an approach of an input object by detecting a change in capacitance; a near field communicator configured to perform near field communication with an information processing terminal present in a communication area in which near field communication is possible, the information processing terminal being capable of performing the near field communication; and a controller configured to control the communication device in accordance with detection of the touch or the approach of the input object by the touch sensor, wherein the controller is configured to reduce detection sensitivity of the touch sensor for detecting the input object when the information processing terminal is in the communication area.

The concept "to reduce detection sensitivity" in the present invention includes not only a concept of narrowing an area in which the approach or the like of the input object is detectable by detecting a change in the capacitance, but also a concept of making it impossible to detect the approach or the like of the input object. That is, the concept "to reduce detection sensitivity" includes a concept of lowering the detection sensitivity down to 0.

The object indicated above may be attained according to another aspect of the invention, which provides a non-transitory computer-readable storage medium in which is stored a program to be executed by a computer of a communication device comprising: a touch sensor configured to detect a touch or an approach of an input object by detecting a change in capacitance; and a near field communicator configured to perform near field communication with an information processing terminal present in a communication area in which near field communication is possible, the information processing terminal being capable of performing the near field communication, wherein the program permits the computer to function as a controller configured to reduce detection sensitivity of the touch sensor for detecting the input object when the information processing terminal is in the communication area.

BRIEF DESCRIPTION OF THE DRAWINGS

The above and other objects, features, advantages and technical and industrial significance of the present invention will be better understood by reading the following detailed description of an embodiment of the invention, when considered in connection with the accompanying drawings, in which.

DETAILED DESCRIPTION OF THE EMBODIMENT

<Structure of MFP>

Figure 1:
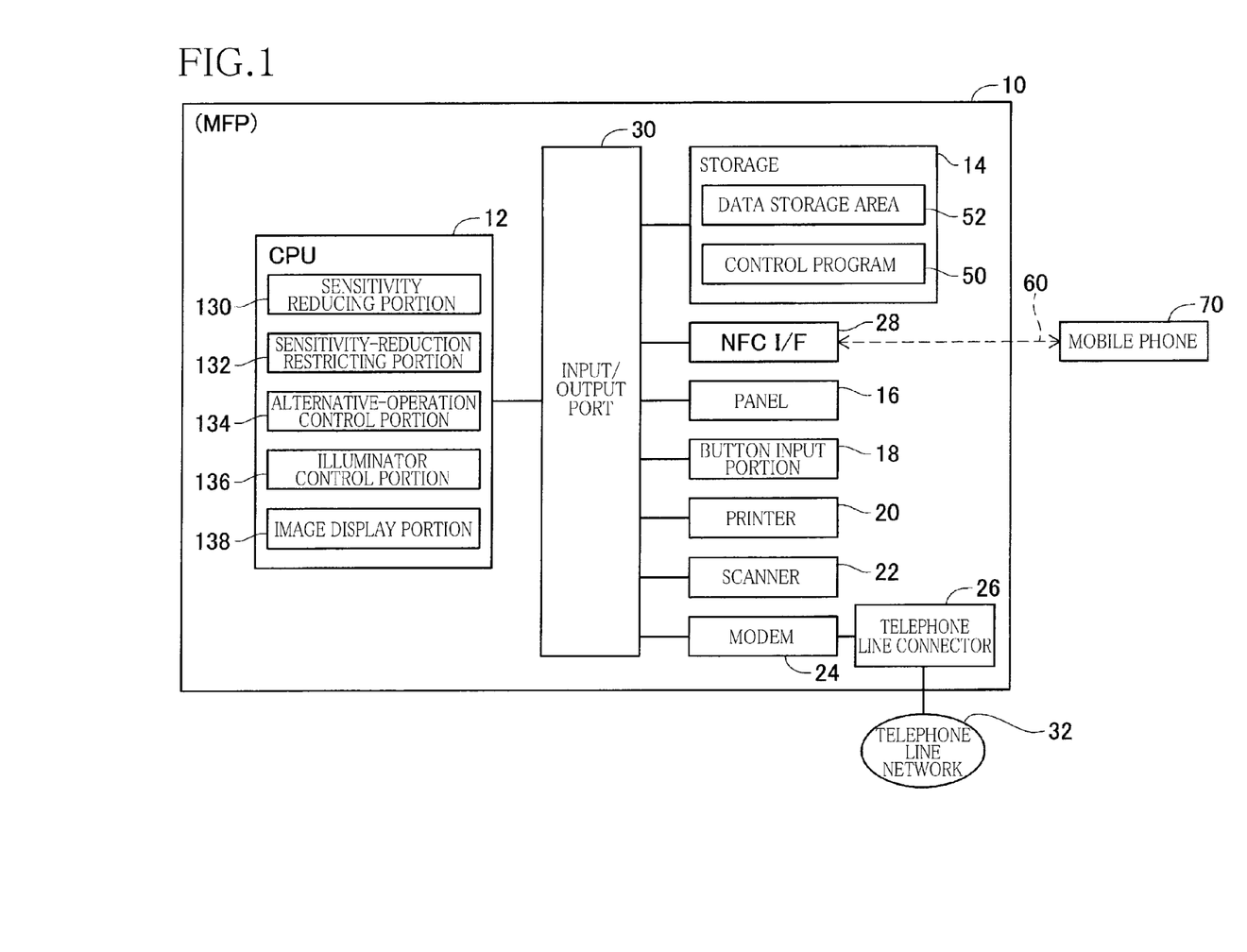
FIG. 1 is a block diagram of an MFP 10.

FIG. 1 is a block diagram of a Multifunction Peripheral (MFP) (as one example of a communication device in the present invention) 10 according to one embodiment of the invention. The MFP 10 mainly includes: a Central Processing Unit (CPU) (as one example of a controller and one example of a computer) 12, a storage 14, a panel (as one example of a display) 16, a button input portion 18, a printer 20, a scanner 22, a modem 24, a telephone line connector 26, and an NFC (Near Field Communication) I/F (as one example of a near field communicator) 28. These components are communicably coupled to one another via an input/output port 30.

The panel 16 has a display surface on which various functions of the MFP 10 are to be displayed. The button input portion 18 includes touch sensors and is configured to detect an approach or a touch of an input tool such as a finger of a user to or on the button input portion 18 and to accept a button operation by the user. The input tool may be referred to as an input object.

The printer 20 is configured to perform printing. The scanner 22 is configured to scan a document to form scan data. The modem 24 is configured to convert document data to be sent by a facsimile function into a signal transmittable to a telephone line network 32 and to send the signal to the telephone line network 32 via the telephone line connector 26. The modem 24 is also configured to receive a signal from the telephone line network 32 via the telephone line connector 26 and to decode the signal into document data.

The CPU 12 is configured to execute processing according to a control program (as one example of a program) 50 stored in the storage 14. The control program 50 is a program for changing sensitivity of the touch sensors of the button input portion 18. It is noted that the storage 14 is constituted by a combination of a Random Access Memory (RAM), a Read Only Memory (ROM), a flash memory, a hard disc (HDD), a buffer of the CPU 12, and so on.

The storage 14 has a data storage area 52. The data storage area 52 is an area for storing various data such as image data for displaying an image on the panel 16 and data necessary for execution of the control program 50.

The NFC I/F 28 is configured to be capable of performing wireless communication 60 according to NFC (near field communication) with a mobile phone 70 (as one example of an information processing terminal) based on the international standard ISO/IEC21481 or ISO/IEC18092. That is, the MFP 10 is capable of performing data communication directly with the mobile phone 70 when the wireless communication 60 according to NFC is available.

<Operation of MFP>

Figure 2:
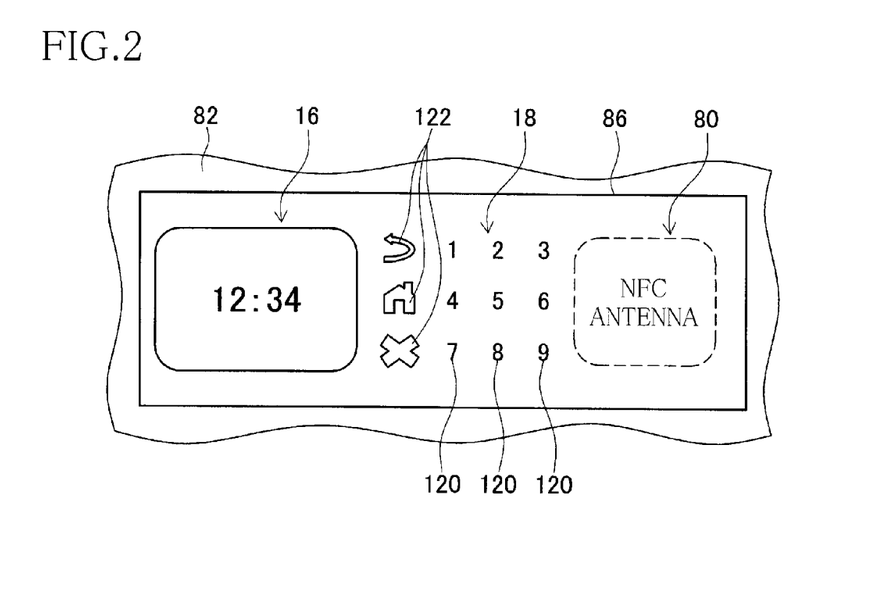
FIG. 2 is a plan view showing a panel 16, a button input portion 18, and an antenna portion 80 of an NFC I/F 28 in the MFP 10.

As described above, the MFP 10 is capable of performing the wireless communication 60 according to NFC via the NFC I/F 28 and is capable of performing data communication directly with the mobile phone 70. More specifically, the NFC I/F 28 includes an antenna portion 80 configured to transmit and receive radio waves used in the wireless communication 60 with the mobile phone 70. The antenna portion 80 is disposed on an upper surface of a body 82 of the MFP 10, as shown in FIG. 2. The button input portion 18 is disposed next to (on the left side of) the antenna portion 80, and a panel 16 is disposed next to (on the left side of) the button input portion 18.

Figure 3:
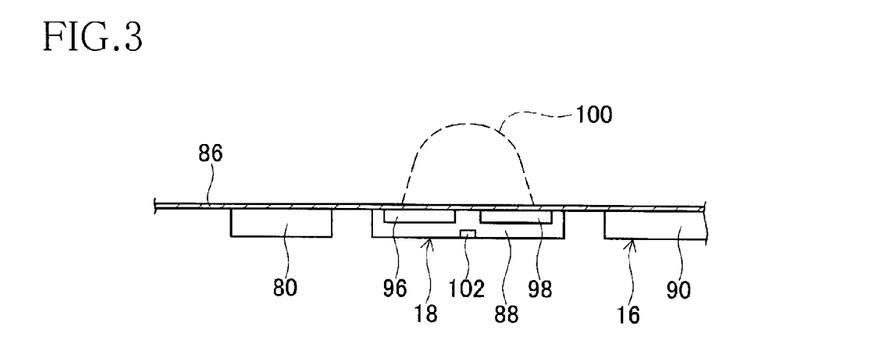
FIG. 3 is a cross-sectional view showing the panel 16, the button input portion 18, and the antenna portion 80 of the NFC I/F 28 in the MFP 10.

As shown in FIG. 3, the antenna portion 80 is covered with a top cover (as one example of a top cover and one example of a plate member) 86. The top cover 86 also covers touch sensors 88 (each as one example of a touch sensor) of the button input portion 18 and a display portion 90 of the panel 16. That is, one top cover 86 functions as a top cover of the antenna portion 80, a top cover of the button input portion 18, and a top cover of the panel 16.

For establishing the wireless communication 60 according to NFC between the MFP 10 and the mobile phone 70, the user brings the mobile phone 70 near to the antenna portion 80. When a distance between the mobile phone 70 and the antenna portion 80 falls within a communication area of wireless communication of the mobile phone 70 by the approach of the mobile phone 70 to the antenna portion 80, the wireless communication 60 according to NFC is established between the mobile phone 70 and the antenna portion 80, namely, between the mobile phone 70 and the MFP 10. Thus, the MFP 10 is capable of transmitting and receiving data such as telephone numbers and images to and from the mobile phone 70 utilizing the wireless communication 60 according to NFC.

In the MFP 10, however, the antenna portion 80 of the NFC I/F 28 is disposed in the proximity of the touch sensors 88 of the button input portion 18. Accordingly, the radio wave used in the wireless communication 60 according to NFC and electric fields used in the touch sensors of the button input portion 18 may mutually interfere, giving rise to a risk that the wireless communication 60 according to NFC is unlikely to be established or misactivation of the touch sensors 88 of the button input portion 18 is caused, in other words, the touch sensors 88 of the button input portion 18 may be erroneously activated. The distance between the antenna portion 80 and the touch sensors 88 is suitably determined in designing the device. In the MFP 10, the distance between the antenna portion 80 and the touch sensors 88 is a distance that causes mutual interference between the radio wave in the wireless communication 60 and electric fields 100 of the touch sensors 88 when a distance between the mobile phone 70 and the antenna portion 80 becomes equal to a distance that allows communication therebetween, in an instance where the radio wave and the electric fields have normal intensity.

The structure of the touch sensors 88 will be explained. As shown in FIG. 3, the touch sensor 88 includes a transmission electrode 96 and a reception electrode 98. When an electric current is supplied to the transmission electrode 96, the electric field 100 is generated between the transmission electrode 96 and the reception electrode 98. When the input tool such as the finger of the user enters the electric field 100, the electric field 100 changes and there is detected a touch or an approach of the input tool owing to the change of the electric field 100. In other words, the touch sensor 88 is configured to detect a touch or an approach of the input tool utilizing a change in capacitance, in other words, by detecting a change in capacitance. The thus constructed touch sensor 88 is called a touch sensor of mutual capacitance detection type among touch sensors of capacitance type. The touch sensors 88 include LEDs (each as one example of an illuminator) 102. Buttons of the button input portion 18 are displayed on the top cover 86 when the LEDs 102 are turned on, as shown in FIG. 2. The illuminator may be referred to as light for lighting the top cover 86.

Figure 4:
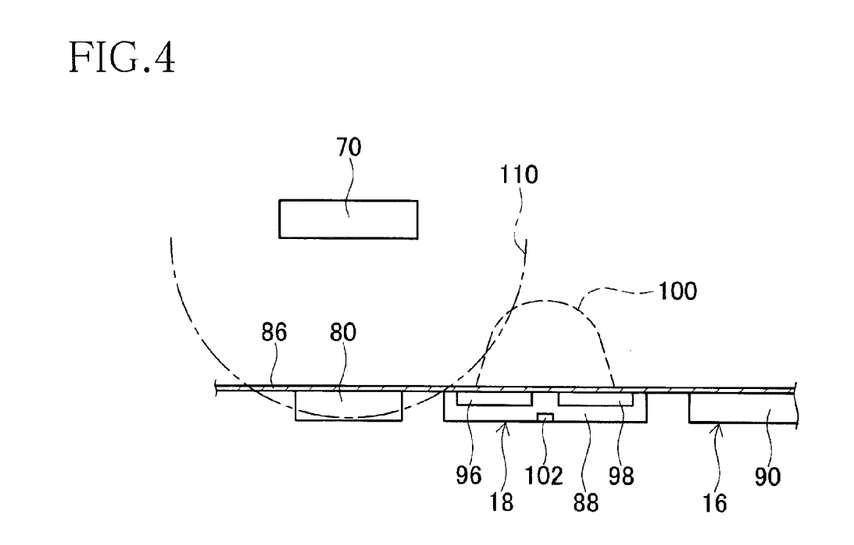
FIG. 4 is a cross-sectional view showing the panel 16, the button input portion 18, and the antenna portion 80 of the NFC I/F 28 in a state in which a mobile phone 70 is brought near to the antenna portion 80.

In the touch sensors 88 of mutual capacitance detection type, the electric fields 100 are formed in the vicinity thereof. As described above, for establishing the wireless communication 60 according to NFC, the mobile phone 70 is brought near to the antenna portion 80 disposed adjacent to the touch sensors 88. When the mobile phone 70 is brought near to the antenna portion 80, the radio wave 110 for the wireless communication 60 generated from the mobile phone 70 gets close to the electric fields 100, so that a radio wave 110 of the mobile phone 70 and the electric fields 100 of the touch sensors 88 mutually interfere, as shown in FIG. 4.

In view of the above, the MFP 10 is configured such that electrification to the touch sensors 88 is interrupted, namely, supply of an electric current to the touch sensors 88 is interrupted, in an instance where the mobile phone 70 is brought near to the antenna portion 80 and the distance between the antenna portion 80 and the mobile phone 70 accordingly falls in an area of the wireless communication 60, namely, in an instance where the distance between the antenna portion 80 and the mobile phone 70 falls within an area covered by the radio wave used in the wireless communication 60. Concretely, an electric power is stopped to be supplied to the transmission electrode 96 when the antenna portion 80 receives the radio wave 110 generated from the mobile phone 70, whereby the electric fields 100 are not generated in the touch sensors 88 and it becomes accordingly possible to suppress the mutual interference between the radio wave 110 of the mobile phone 70 and the electric fields 100 of the touch sensors 88. In other words, the MFP 10 is configured such that detection sensitivity of the touch sensors 88 for detecting the input tool is reduced when the distance between the antenna portion 80 and the mobile phone 70 falls within the area of the wireless communication 60.

In this respect, however, the interruption of electrification to the touch sensors 88 disables the function of the touch sensors 88 as the operation buttons, in other words, disables the operations of the MFP 10 using the button input portion 18. In view of this, the MFP 10 is configured such that electrification to only some of the buttons of the touch sensors 88 of the button input portion 18 is interrupted. More specifically, the button input portion 18 includes nine numerical keys 120 and three individual keys 122. The numerical keys 120 are disposed next to (on the left side of) the antenna portion 80, and the individual keys 122 are disposed next to (on the right side of) the panel 16, as shown in FIG. 2. In other words, the numerical keys 120 are disposed near the antenna portion 80 while the individual keys 122 are disposed distant from the antenna portion 80. Accordingly, the numerical keys 120 are likely to be influenced by the radio wave 110 of the mobile phone 70 that is brought near to the antenna portion 80 while the individual keys 122 are not likely to be influenced by the radio wave 110. Accordingly, when the mobile phone 70 is brought near to the antenna portion 80, electrification to the touch sensors 88 of the numerical keys 120 is interrupted while electrification to the touch sensors 88 of the individual key 122 is maintained. Therefore, even when the mobile phone 70 is brought near to the antenna portion 80, the individual keys 122 that are unlikely to be influenced by the radio wave 110 are operable. In this respect, the touch sensors 88 of the numerical keys 120 disposed near the antenna portion 80 may be referred to as touch sensors disposed within the area of the radio wave 110 of the mobile phone 70 that is brought near to the antenna portion 80 while the touch sensors 88 of the individual keys 122 disposed distant from the antenna portion 80 may be referred to as touch sensors disposed outside the range of the radio wave 110 of the mobile phone 70 that is brought near to the antenna portion 80.

Figure 5:
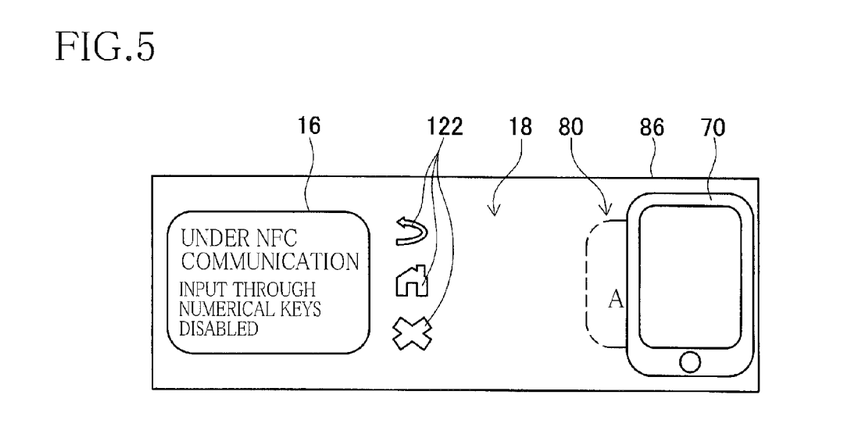
FIG. 5 is a plan view showing the panel 16, the button input portion 18, and the antenna portion 80 of the NFC I/F 28 in a state in which the mobile phone 70 is brought near to the antenna portion 80.

Further, when the mobile phone 70 is brought near to the antenna portion 80 and electrification to the touch sensors 88 of the numerical keys 120 are interrupted, the LEDs 102 of the touch sensors 88 of the numerical keys 120 are turned off. Accordingly, the numerical keys 120 are not displayed on the top cover 86, as shown in FIG. 5. Further, when electrification to the touch sensors 88 of the numerical keys 120 is interrupted, an image indicating that input through the numerical keys 120 is impossible is displayed on the panel 16. It becomes accordingly possible to inform the user that the numerical keys 120 are not operable due to the approach of the mobile phone 70 to the antenna portion 80.

When the wireless communication 60 is established between the MFP 10 and the mobile phone 70 as a result of the approach of the mobile phone 70 to the antenna portion 80, transmission and reception of various data are performed between the MFP 10 and the mobile phone 70. In this instance, it is sometimes necessary to operate the numerical keys 120 for performing selection of various data, or the like. As described above, however, when the mobile phone 70 is brought near to the antenna portion 80, the input through the numerical keys 120 is impossible, causing a risk of deterioration in operability.

Figure 6:
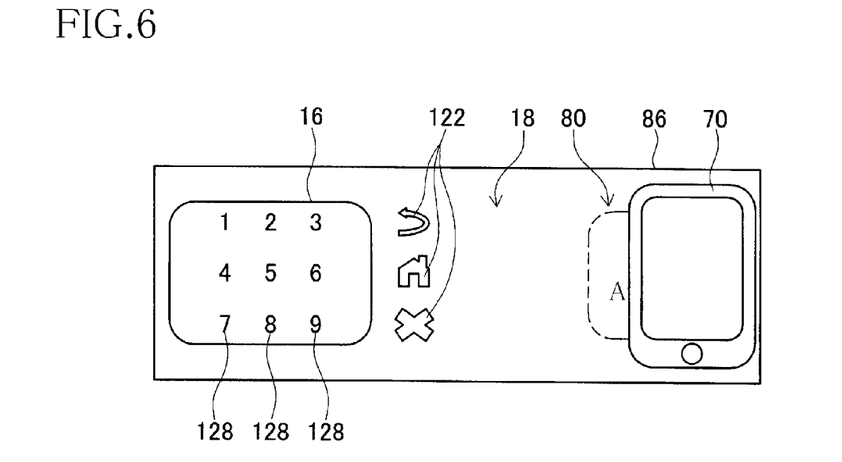
FIG. 6 is a plan view showing the panel 16, the button input portion 18, and the antenna portion 80 of the NFC I/F 28 in a state in which the mobile phone 70 is brought near to the antenna portion 80.

In view of the above, the MFP 10 is configured such that nine temporal numerical keys (as one example of an acceptor) 128 are displayed on the panel 16, as shown in FIG. 6. The panel 16 has a function as a touch panel and is capable of accepting an operation on the temporal numerical keys 128. When the operation on the temporal numerical keys 128 is accepted, there is executed, in the MFP 10, the same processing as that when the numerical keys 120 are operated. Therefore, the MFP 10 enables execution of the same processing as that when the numerical keys 120 are operated, thereby obviating deterioration in operability.

It is noted that the interruption of electrification to the touch sensors 88 of the numerical keys 120 described above is not performed when the numerical keys 120 are being operated. More specifically, when the user is inputting a telephone number or the like using the numerical keys 120, for instance, it is preferable that the input job of the telephone number takes precedence over the interruption of electrification. Accordingly, when the numerical keys 120 are being operated and an instruction of input or selection based on the operation of the numerical keys 120 is being accepted, electrification to the touch sensors 88 of the numerical keys 120 is not interrupted even if the mobile phone 70 is brought near to the antenna portion 80.

In this respect, a judgment as to whether the numerical keys 120 are being operated, namely, a judgment as to whether the instruction of input or selection based on the operation of the numerical keys 120 is being accepted, is performed according to the following techniques. According to a first judgment technique, it is judged that the numerical keys 120 are being operated until a preset time elapses after the numerical keys 120 have been operated. Further, when printing, scanning, or the like is performed in the MFP 10, there is an instance in which details of a job (job details) to be carried out by the user are displayed on the panel 16. Accordingly, there is an instance in which job details to the effect that certain numerals or the like are to be input using the numerical keys 120 are displayed on the panel 16 and the user carries out an input job using the numerical keys 120 in accordance with the details displayed on the panel 16. Therefore, according to a second judgment technique, it is judged that the numerical keys 120 are being operated when a message requiring certain input using the numerical keys 120 is being displayed on the panel 16. According to this technique, it is possible to judge that the numerical keys 120 are being operated in an instance where the numerical keys 120 are expected to be operated in a certain job, whereby the numerical keys 120 can be operated with high reliability.

<Control Program>

Figure 7:
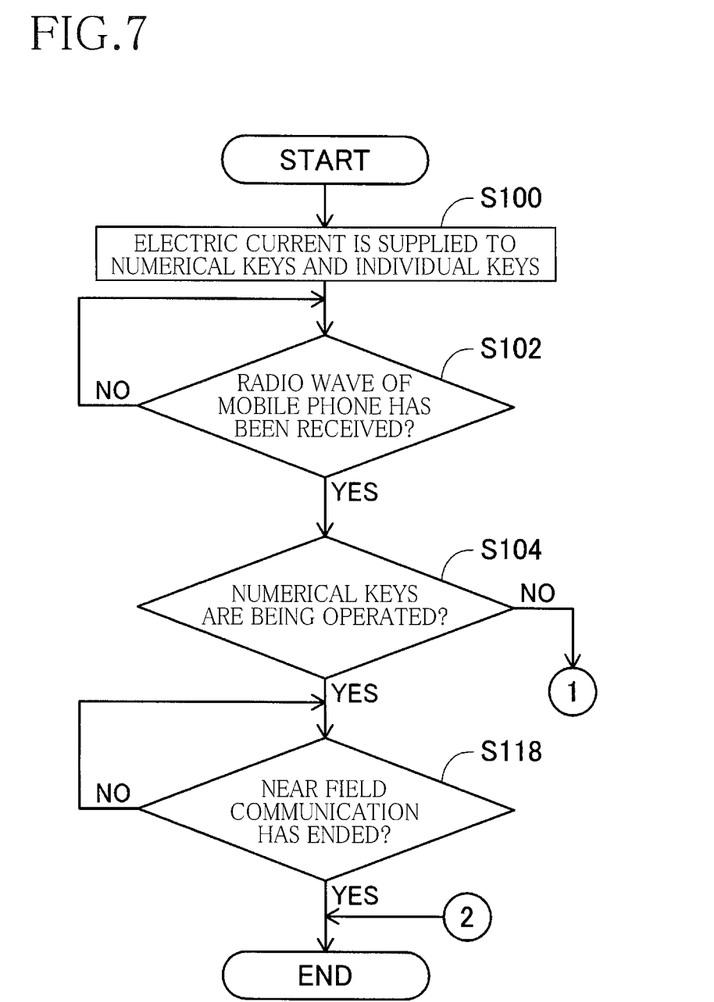
FIG. 7 is a flow chart showing processing in the MFP 10.
Figure 8:
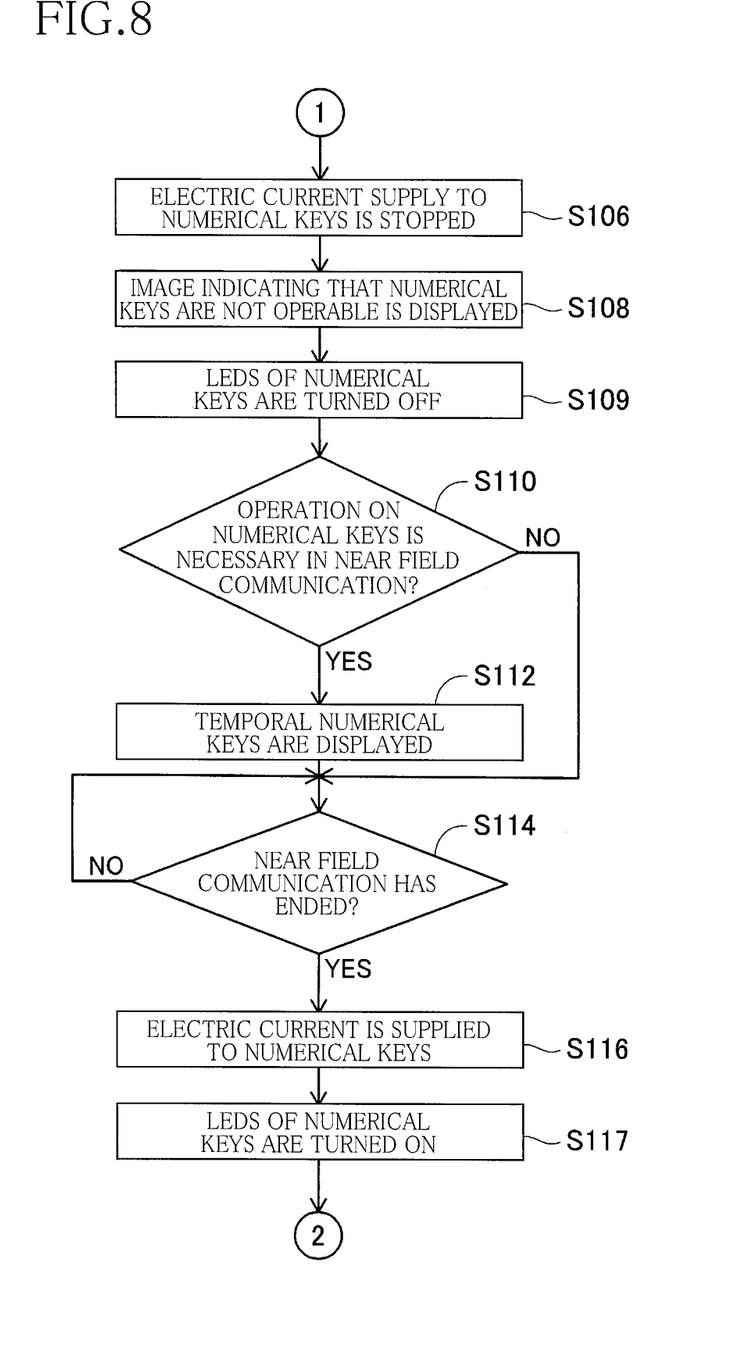
FIG. 8 is a flow chart showing processing in the MFP 10.

The above-described mutual interference between the radio wave 110 of the mobile phone 70 and the electric fields 100 of the touch sensors 88 is suppressed by execution of the control program 50 by the CPU 12. With reference to FIGS. 7 and 8, there will be concretely explained a flow for suppressing the mutual interference between the radio wave 110 of the mobile phone 70 and the electric fields 100 of the touch sensors 88. The program is executed when the MFP 10 is turned on.

According to the control program 50, there is supplied an electric current to the touch sensors 88 of the numerical keys 120 and the individual keys 122 (Step 100). (Hereinafter, "Step" is abbreviated as "S".) As a result, the electric fields 100 are formed in the vicinity of the touch sensors 88 of the numerical keys 120 and the individual keys 122, and it becomes possible to detect a touch or an approach of the input tool by the numerical keys 120 and the individual keys 122.

Subsequently, it is judged by the CPU 12 whether the antenna portion 80 has received the radio wave 110 generated by the mobile phone 70 (S102). If the antenna portion 80 has not yet received the radio wave 110 (S102: NO), the processing in S102 is repeated. On the other hand, if the antenna portion 80 has received the radio wave 110 (S102: YES), it is judged by the CPU 12 whether the numerical keys 120 are being operated (S104). The judgment as to whether the numerical keys 120 are being operated is performed according to the judgment techniques explained above.

If the numerical keys 120 are not being operated (S104: NO), electrification to the touch sensors 88 of the numerical keys 120 is interrupted (S106). That is, the electric current is stopped to be supplied to the touch sensors 88 of the numerical keys 120. Subsequently, as shown in FIG. 5, there is displayed, on the panel 16, an image indicating that the numerical keys 120 are not operable (S108). Further, the LEDs 102 of the touch sensors 88 of the numerical keys 120 are turned off (S109).

Subsequently, it is judged by the CPU 12 whether an operation on the numerical keys 120 is necessary in a state in which the wireless communication 60 between the MFP 10 and the mobile phone 70 is established (S110). If the operation on the numerical keys 120 is necessary in the state in which the wireless communication 60 is established (S110: YES), the temporal numerical keys 128 are displayed on the panel 16 (S112). On the other hand, if the operation on the numerical keys 120 is not necessary in the state in which the wireless communication 60 is established (S110: NO), the processing in S112 is skipped.

Subsequently, it is judged by the CPU 12 whether the wireless communication 60 has ended (S114). In other words, it is judged by the CPU 12 whether the mobile phone 70 has been moved away from the MFP 10 and the antenna portion 80 no more receives the radio wave 110 of the mobile phone 70. If the wireless communication 60 has not ended yet (S114: NO), the processing in S114 is repeated.

On the other hand, if the wireless communication 60 has ended (S114: YES), an electric current is supplied to the touch sensors 88 of the numerical keys 120 (S116). Thereafter, the LEDs 102 of the touch sensors 88 of the numerical key 120 are turned on (S117). According to the processing described above, the control program 50 ends.

If it is judged in S104 that the numerical keys 120 are being operated (S104: YES), it is judged by the CPU 12 whether the wireless communication 60 has ended (S118). If the wireless communication 60 has not ended yet (S118: NO), the processing in S118 is repeated. On the other hand, if the wireless communication 60 has ended (S118: YES), execution of the control program 50 ends. When one execution of the control program 50 ends, the processing in S102 and subsequent steps is again executed.

<Functional Structure of CPU>

It may be considered that the CPU 12 configured to execute the control program 50 described above has a functional structure shown in FIG. 1 in view of processing executed by the CPU 12. As apparent from FIG. 1, the CPU 12 has a sensitivity reducing portion 130, a sensitivity-reduction restricting portion 132, an alternative-operation control portion 134, an illuminator control portion 136, and an image display portion 138.

The sensitivity reducing portion 130 is a functional portion to execute the processing in S106 of the control program 50, namely, a functional portion to interrupt electrification to the touch sensors 88 of the numerical keys 120. The sensitivity-reduction restricting portion 132 is configured to restrict reduction of detection sensitivity of the touch sensors 88 in a situation in which an instruction based on detection of the touch or the approach of the input tool by the touch sensors 88 is being accepted even when the distance between the antenna portion 80 and the mobile phone 70 falls within the communication area of the wireless communication 60. More specifically, the sensitivity-reduction restricting portion 132 is a functional portion to execute the processing in S104 of the control program 50, namely, a functional portion to restrict the interruption of electrification to the touch sensors 88 of the numerical keys 120 when the numerical keys 120 are being operated even where the mobile phone 70 is brought near to the MFP 10. The alternative-operation control portion 134 is a functional portion to execute the processing in S112 of the control program 50, namely, a functional portion to display the temporal numerical keys 128 on the panel 16. The illuminator control portion 136 is a functional portion to execute the processing in S109 and S117 of the control program 50, namely, a functional portion to control the LEDs 102 to be turned on and off. The image display portion 138 is a functional portion to execute the processing in S108 of the control program 50, namely, a functional portion to display, on the panel 16, an image indicating that the numerical keys 120 are not operable.

Advantages

In the MFP 10 constructed as described above, the detection sensitivity of the touch sensors 88 of capacitance type for detecting the input tool (input object) is reduced when the mobile phone 70 is in the area of near field communication. By reducing the detection sensitivity of the touch sensors 88 of capacitance type, the electric fields 100 of the touch sensors 88 may be weakened or the electric fields 100 may be prevented from being generated, so that mutual interference between the radio wave 110 in the near field communication and the electric fields 100 of the touch sensors 88 can be suppressed.

In the MFP 10 constructed as described above, the detection sensitivity of the touch sensors 88 is reduced by interrupting an electric current supplied thereto. The arrangement enables the mutual interference between the radio wave 110 in the near field communication and the electric fields 100 of the touch sensors 88 to be suppressed with high reliability.

In the MFP 10 constructed as described above, the detection sensitivity of the touch sensors 88 is restricted from being reduced when an instruction based on the detection of the touch or the approach of the input tool by the touch sensors 88 is being accepted, namely, when the touch sensors 88 are being operated, even when the mobile phone 70 is in the area of near field communication. The arrangement obviates suspension of an input operation using the touch sensors 88.

In the MFP 10 constructed as described above, the detection sensitivity of the touch sensors 88 is restricted from being reduced when an image requesting a touch or an approach of the input tool is being displayed on the panel 16, namely, when the touch sensors 88 are being operated in accordance with an instruction or the like displayed on the panel 16, even when the mobile phone 70 is in the area of near field communication. According to the arrangement, an input operation can be performed preferentially in accordance with an instruction or the like indicated by the image displayed on the panel 16.

In the MFP 10 constructed as described above, the detection sensitivity of the touch sensors 88 is restricted from being reduced until a preset time elapses after the touch sensors 88 have detected the touch or the approach of the input tool, even when the mobile phone 70 is in the area of near field communication. The arrangement obviates suspension of an input operation using the touch sensors 88 with high reliability.

In the MFP 10 constructed as described above, the detection sensitivity of the touch sensors 88 of the numerical keys 120 is reduced by interrupting electrification to the touch sensors 88 of the numerical keys 120 that are disposed near the antenna portion 80. According to the arrangement, the individual keys 122 other than the numerical keys 120 can be normally operated.

In the MFP 10 constructed as described above, the MFP 10 is controlled according to the same manner as that when the MFP 10 is controlled in accordance with the detection of the touch or the approach by the touch sensors 88, in response to acceptance of the button operation by the temporal numerical keys 128 when the detection sensitivity of the touch sensors 88 of the numerical keys 120 is being reduced. In other words, by performing the button operation on the temporal numerical keys 128 instead of the numerical keys 120, the MFP 10 can be operated similarly when operated in accordance with the operation on the numerical keys 120. The arrangement obviates deterioration in operability that would be otherwise caused by the reduction in the detection sensitivity of the touch sensors 88 of the numerical keys 120.

In the MFP 10 constructed as described above, an image indicating that the detection sensitivity of the touch sensors 88 is reduced is displayed on the panel 16 when the detection sensitivity of the touch sensors 88 is being reduced. According to the arrangement, the user can recognize the reduction in the detection sensitivity of the touch sensors 88, and convenience is ensured.

In the MFP 10 constructed as described above, the LEDs 102 are controlled so as to be turned off when the detection sensitivity of the touch sensors 88 is being reduced and controlled so as to be turned on when the detection sensitivity of the touch sensors 88 is not being reduced. The arrangement makes it possible to prevent a user's operation on the touch sensors 88 whose detection sensitivity is being reduced.

In the MFP 10 constructed as described above, the touch sensors 88 are disposed between the panel 16 and the antenna portion 80. According to the arrangement, the touch sensors 88, the panel 16, and the antenna portion 80 can be disposed so as to be adjacent to one another, enhancing operability of the touch sensors 88 in accordance with an instruction indicated by an image displayed on the panel 16, in the near field communication.

In the MFP 10 constructed as described above, a top cover of the button input portion 18, a top cover of the antenna portion 80, and a top cover of the panel 16 are formed so as to be flush with one another. In other words, the top cover 86 functions as the top covers of the button input portion 18, the antenna portion 80, and the panel 16. The arrangement eliminates a level difference among the button input portion 18, the panel 16, and the antenna portion 80, enhancing operability.

In the MFP 10 constructed as described above, the top cover of the button input portion 18, the top cover of the antenna portion 80, and the top cover of the panel 16 may be formed of one transparent plate member, namely, the top cover 86. The arrangement ensures a reduced number of required components of the MFP 10.

Modified Example

It is to be understood that the present invention is not limited to the details of the embodiment illustrated above, but may be embodied with various changes and modifications, which may occur to those skilled in the art. In the illustrated embodiment, the mutual interference between the radio wave 110 of the mobile phone 70 and the electric fields 100 of the touch sensors 88 is suppressed by interrupting electrification to the touch sensors 88 when the mobile phone 70 is brought near to the MFP 10. The mutual interference between the radio wave 110 and the electric fields 100 may be suppressed by weakening the electric fields 100 of the touch sensors 88 according to a modified example shown in FIG. 9, for instance.

Figure 9:
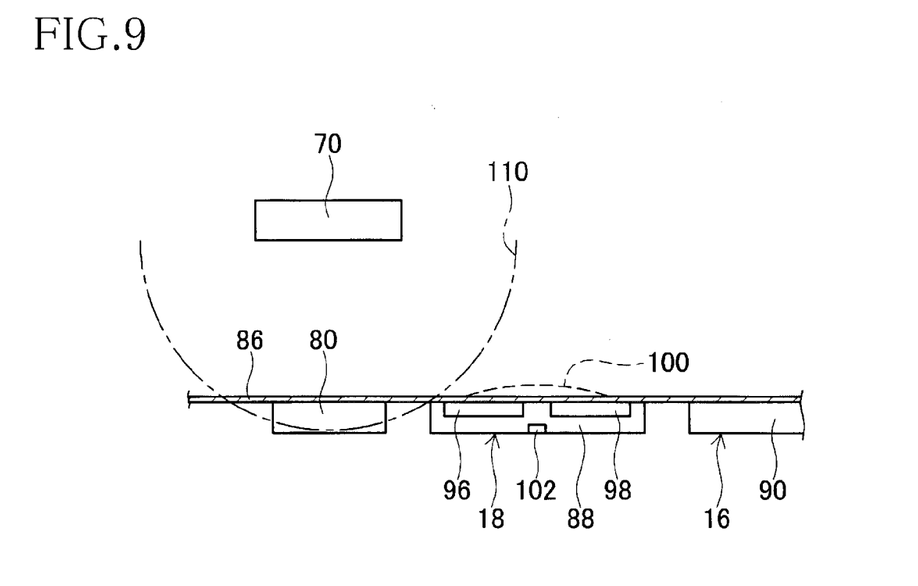
FIG. 9 is a cross-sectional view showing the panel 16, the button input portion 18, and the antenna portion 80 of the NFC I/F 28 in the MFP 10 according to a modified example in a state in which the mobile phone 70 is brought near to the antenna portion 80.

As shown in FIG. 9, the electric field 100 generated between the transmission electrode 96 and the reception electrode 98 may be weakened by decreasing an amount of the electric current supplied to the transmission electrode 96 of the touch sensor 88. The arrangement makes it possible to suppress the mutual interference between the radio wave 110 of the mobile phone 70 and the electric fields 100 of the touch sensors 88 even when the mobile phone 70 is brought near to the MFP 10. Further, since an operation on the touch sensors 88 is possible, it is possible to suppress deterioration in operability.

In the illustrated embodiment, the detection sensitivity of the touch sensors 88 is reduced in an instance where the mobile phone 70 generates the radio wave 110 and the distance between the mobile phone 70 and the antenna portion 80 falls with the area of wireless communication of the mobile phone 70. Alternatively, the detection sensitivity of the touch sensors 88 may be reduced in an instance where the antenna portion 80 generates the radio wave and the distance between the mobile phone 70 and the antenna portion 80 falls with an area of wireless communication of the antenna portion 80.

In the illustrated embodiment, the MFP 10 is employed as the communication device configured to perform the wireless communication 60 with the mobile phone 70. Alternatively, as the communication device, there may be employed various devices such as printers and personal computers (PC).

In the illustrated embodiment, the mobile phone 70 is employed as the information processing terminal configured to perform the wireless communication 60 with the MFP 10. As the information processing terminal, tablet devices, smartphones, and so on may be employed.

In the illustrated embodiment, the temporal numerical keys 128 displayed on the panel 16 are employed as buttons to be replaced with the numerical keys 120. Alternatively, other buttons such as the individual keys 122 may be employed in place of the numerical keys 120. Further, as the buttons to be replaced with the numerical keys 120, not only buttons of touch sensor type, but also mechanical buttons may be employed.

In the illustrated embodiment, the touch sensors of mutual capacitance detection type are employed as the touch sensors 88. Alternatively, touch sensors of self-capacitance detection type may be employed as the touch sensors 88. The touch sensor of self-capacitance detection type is configured to detect parasitic capacitance generated in an electrode and to detect a touch or an approach of the input tool on the basis of the parasitic capacitance that changes with the approach of the input tool.

In the illustrated embodiment, the wireless communication according to NFC is employed as the near field communication. Alternatively, it is possible to employ wireless communication according to Transfer Jet or the like.

In the illustrated embodiment, the processing shown in FIGS. 7 and 8 is executed by the CPU 12. Alternatively, the processing may be executed by an ASIC and other logic integrated circuits. The CPU 12, the ASIC, and other logic integrated circuits may cooperate with one another to execute the processing.

What is claimed is:

1. A communication device, comprising:
   a touch sensor configured to detect a touch or an approach of an input object by detecting a change in capacitance;
   a near field communicator configured to perform near field communication with an information processing terminal present in a communication area in which near field communication is possible, the information processing terminal being capable of performing the near field communication; and
   a controller configured to control the communication device in accordance with detection of the touch or the approach of the input object by the touch sensor,
   wherein the controller is configured to reduce detection sensitivity of the touch sensor for detecting the input object when the information processing terminal is in the communication area.

2. The communication device according to claim 1, wherein the controller is configured to reduce the detection sensitivity of the touch sensor by narrowing an area in which the change in the capacitance is detectable.

3. The communication device according to claim 1, wherein the touch sensor is configured to detect the touch or the approach of the input object by detecting the change in the capacitance utilizing an electric field generated between two electrodes, and
   wherein the controller is configured to reduce the detection sensitivity of the touch sensor by weakening the electric field generated between the two electrodes.

4. The communication device according to claim 1, wherein the controller is configured to reduce the detection sensitivity of the touch sensor by interrupting an electric current supplied to the touch sensor.

5. The communication device according to claim 1, wherein the controller is configured to restrict reduction of the detection sensitivity of the touch sensor when an instruction based on the detection of the touch or the approach of the input object by the touch sensor is being received, even when the information processing terminal is in the communication area.

6. The communication device according to claim 1, further comprising a display on which an image is displayed,
   wherein the controller is configured to restrict reduction of the detection sensitivity of the touch sensor when an image requesting a touch or an approach of the input object is being displayed on the display, even when the information processing terminal is in the communication area.

7. The communication device according to claim 1, wherein the controller is configured to restrict reduction of the detection sensitivity of the touch sensor until a preset time elapses after the touch sensor has detected the touch or the approach of the input object, even when the information processing terminal is in the communication area.

8. The communication device according to claim 1, comprising a plurality of touch sensors each as the touch sensor,
   wherein the controller is configured to reduce the detection sensitivity of only some of the plurality of touch sensors that are disposed near the near field communicator.

9. The communication device according to claim 1, further comprising an acceptor configured to accept a button operation,
   wherein the controller is configured to control the communication device according to the same manner as that when the communication device is controlled in accordance with the detection of the touch or the approach by the touch sensor, in response to acceptance of the button operation by the acceptor when the detection sensitivity of the touch sensor is being reduced.

10. The communication device according to claim 1, further comprising a display on which an image is displayed,
    wherein the controller is configured to display, on the display, an image indicating that the detection sensitivity of the touch sensor is reduced when the detection sensitivity of the touch sensor is being reduced.

11. The communication device according to claim 1,
    wherein the touch sensor has a top cover and light for lighting the top cover, and
    wherein the controller is configured to control the light to be turned off when the detection sensitivity of the touch sensor is being reduced and to control the light to be turned on when the detection sensitivity of the touch sensor is not being reduced.

12. The communication device according to claim 1, further comprising a display on which an image is displayed,
    wherein the touch sensor is disposed between the display and the near field communicator.

13. The communication device according to claim 1, further comprising a display on which an image is displayed,
    wherein a top cover of the touch sensor, a top cover of the near field communicator, and a top cover of the display are formed so as to be flush with one another.

14. The communication device according to claim 13, wherein the top cover of the touch sensor, the top cover of the near field communicator, and the top cover of the display are formed of one transparent plate member.

15. A non-transitory computer-readable storage medium in which is stored a program to be executed by a computer of a communication device comprising: a touch sensor configured to detect a touch or an approach of an input object by detecting a change in capacitance; and a near field communicator configured to perform near field communication with an information processing terminal present in a communication area in which near field communication is possible, the information processing terminal being capable of performing the near field communication, wherein the program permits the computer to function as a controller configured to reduce detection sensitivity of the touch sensor for detecting the input object when the information processing terminal is in the communication area.

* * * * *